Dec. 5, 1961  A. M. BARRETT, JR  3,012,178
CONTROL SYSTEM
Filed March 4, 1957  2 Sheets-Sheet 1

INVENTOR.
Arthur M. Barrett Jr.
BY
ATTYS.

INVENTOR.
Arthur M. Barrett Jr.

United States Patent Office 3,012,178
Patented Dec. 5, 1961

3,012,178
CONTROL SYSTEM
Arthur M. Barrett, Jr., Lake Forest, Ill., assignor to Barrett-Cravens Company, Northbrook, Ill., a corporation of Illinois
Filed Mar. 4, 1957, Ser. No. 643,819
12 Claims. (Cl. 318—271)

The present invention is directed to an electrical control system, and more particularly to an electrical control system for providing improved regulation of the acceleration and speed of a mobile vehicle.

Mobile units known in the trade as "industrial trucks," are time and labor saving vehicles which are primarily used to transport materials between different areas in a plant or yard, or between the different buildings of a large industrial firm. The units have also proven their utility in the loading and unloading of freight cars and trucks, in material handling in construction jobs, and in many other applications.

A particular type of truck that has met with wide industrial acceptance is the electric or electrically motivated truck which, while affording a great many advantages, has suffered the disadvantage, particularly in the handling of fragile or potentially dangerous goods, that its operation is not uniformly smooth and gentle. Specifically, control of the truck has been obtained by simple manual switching, so that by inherent inclination (a) the truck tends to lurch forward or backward at a high rate of acceleration from a stopped position, (b) speed control can be effeced only in a general sense and then with a degree of difficulty, (c) jockeying of the truck into position to pick up or deposit a load is generally accomplished by a prolonged series of intermittent jerks or lurches, and (d) truck operation is dependent solely on the skill of the operator. Moreover, in automatic remotely controlled trucks, operator skill is dispensed with, whereupon the other enumerated disadvantages are magnified.

The desirability and need for a unit having automatic smooth acceleration and speed regulation is believed apparent. Such type control would increase the maneuverability and speed of maneuvering the truck, minimize the possibility of injury to personnel, mitigate against falling or slipping loads, and reduce breakage and damage to the materials handled. Improved acceleration and speed control would also increase the scope of application of the equipment in that it would render more practical the use of the unit in the transporting of materials such as acids, etc., which might otherwise be considered potentially dangerous, and broaden the field of use of remotely controlled trucks.

It is a primary object of the present invention, therefore, to provide a new and novel control system for a mobile unit, and particularly, to provide improved electric industrial trucks embodying means for automatically controlling the rate of acceleration and the speed of the truck.

An improved control system having these advantages and features has utility, of course, in either driver controlled or remotely controlled industrial trucks. Particular advantage is obtained in its use with the newly developed, driverless mobile truck of the type disclosed in the copending application of Robert De Liban, entitled "Guidance Systems," which was filed December 8, 1955, Serial No. 551,770, and its use in such arrangement as well as its use with an operator controlled truck are set forth herein.

General description

The novel control system basically comprises an arrangement for regulating the energy level input to the propulsion means for a mobile unit, and includes a variable carbon pile resistance element which is adjustable through its range to control coupling of different energy levels to the propulsion means. According to the present invention, this primary control element is actuated by pressure applying means, in the form suitably of a solenoid, which in turn is governed in such manner as gradually to increase pressure on the carbon pile thereby gradually to increase current flow to the propulsion means in a smooth and uniform manner, whereupon the propulsion means smoothly and gradually accelerates the vehicle. The governing means for the pressure applying or pile solenoid preferably includes variable resistance means in the solenoid circuit and an actuator for the resistance means which is operable at a selective speed and which, upon initial energization of the system, commences to operate progressively and smoothly to reduce the impedance or resistance of the solenoid circuit to accomplish the described results.

The control system further includes a speed regulating device which may be preset to provide a predetermined maximum speed for the vehicle. The speed control unit basically comprises an arrangement for providing a control signal as the vehicle reaches a predetermined speed, and means responsive to such signal for controlling the same variable resistance means as used during acceleration of the motor to maintain the speed of the motor at the desired level. The control circuit may also include switch means which use the same pile or pressure applying solenoid to control the value of resistance introduced into the motor circuit during dynamic braking of the mobile vehicle, and novel safety means for quickly stopping the vehicle in the event of impact with a foreign object, which safety means are more fully disclosed and taught in the copending application of Francis C. Paradise Serial No. 654,242, filed April 22, 1957, now Patent No. 2,920,713 issued January 12, 1960.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

System components

The novel control system basically includes an arrangement for selectively controlling energization of a reversible electric drive motor 10 which comprises the propulsion or motivating means of an industrial truck or other similar type mobile unit. The drive motor includes a series field 20, and a shunt field 45 which is connected to provide dynamic braking of the mobile unit. The potential source provided is necessarily consistent with that of the motor and control system characteristics, the source in the disclosed arrangement being a 24 volt battery having a positive terminal 19 and a negative terminal indicated by a ground symbol.

A pair of push buttons $F_{pb}$ and $R_{pb}$ are provided in manually controlled vehicles to initiate forward and reverse motion of the truck, the actual switching of the motor circuit being accomplished by a pair of control relays F and R respectively, which are controlled by the push buttons $F_{pb}$ and $R_{pb}$.

Figure 1:
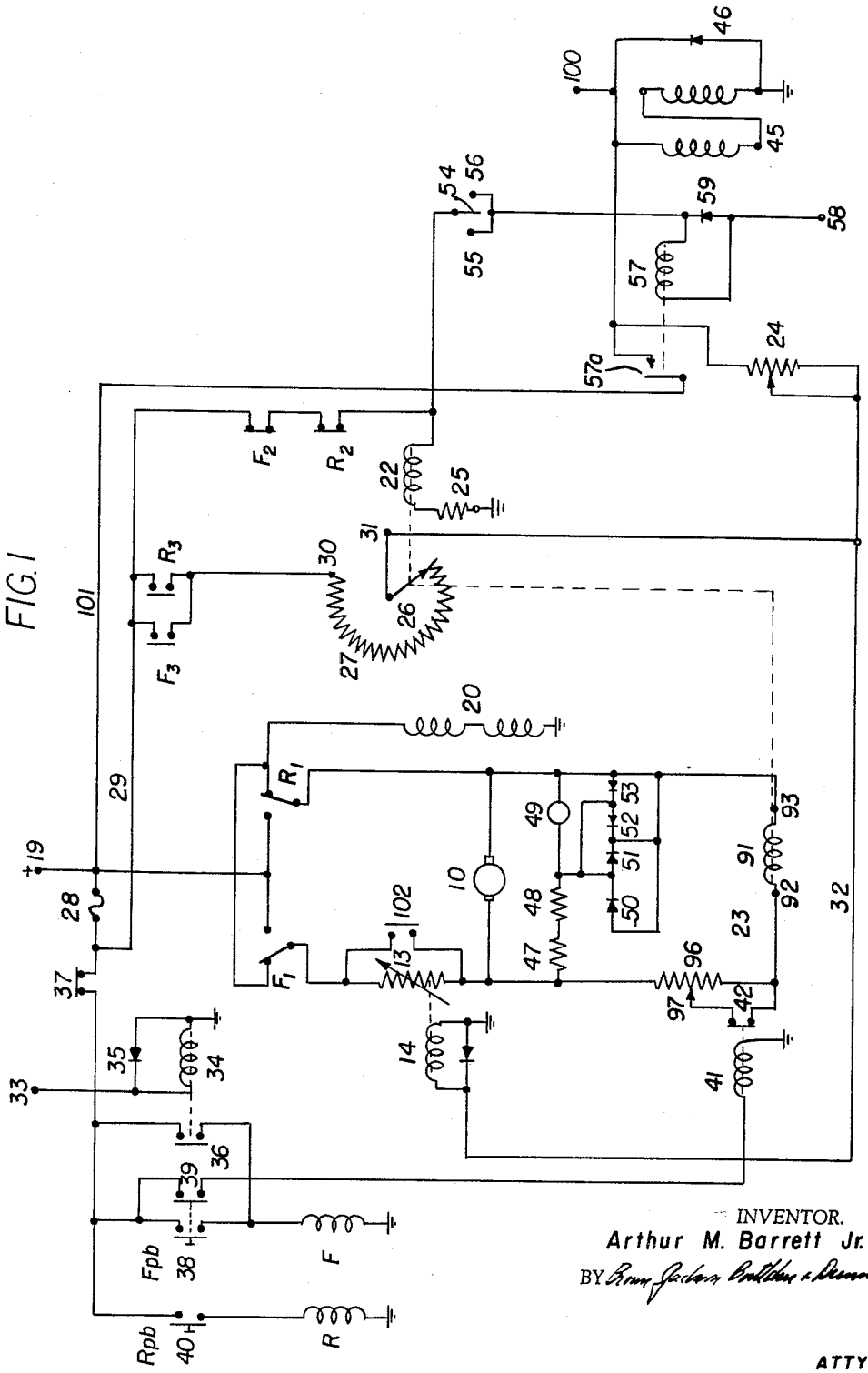
FIGURE 1 is a schematic diagram of an embodiment of a control circuit of the invention.

The control relays F and R may, of course, be energized over circuits having any number of interlocks and safeguards (not shown), and by various types of starting switches. In trucks of the type used in an automatic guidance system such as taught in the above identified application, or in alternative control systems such as systems wherein photosensitive equipment is arranged to produce a signal proportional to the distance of such equipment from a white line, or in which a radiation sensitive detector is arranged to produce a signal related to its distance from a radioactive path, the control circuits for the relays F and R, for example, may be arranged to be energized responsive to the receipt of signals over conductors extending to the associated equipment, or by push buttons such as $F_{pb}$ and $R_{pb}$, or by both. The circuit of FIGURE 1 illustrates the manner in which either or both of these control arrangements may be incorporated in the system. Briefly, the two-step push button $F_{pb}$ includes contacts 38 which are connected to complete an energizing circuit for the control relay F, which circuit extends from the positive terminal 19 of the source over the safety fuse 28, brake switch 37, contacts 38, and the winding of relay F to ground. The push button $F_{pb}$ additionally includes the second set of contacts 39 which are operative to complete a "high speed" circuit for effecting operation of the vehicle at a faster speed, as more fully described hereinafter. A similar push button $R_{pb}$ may be used to control energization of reverse relay R.

If the system is to be controlled by signals received from a guidance system the arrangement may include an input terminal, such as 33, over which the sensing signals are applied to a control relay 34, which relay is effective at its contacts 36 to connect the control relay F to the potential source. The manner in which the control circuit for the reverse relay is modified to respond to signals from a sensing circuit is obvious from the description of the control relay 34.

The two control relays F and R in their operation basically control (a) the energization of the motor in a particular direction; (b) operation of a pile solenoid to control the motor speed; and (c) operation of an acceleration circuit to control the pile solenoid. More specifically, relay F and relay R include a set of make-brake contacts $F_1$, $R_1$, respectively, which are connected in the energization circuits for the motor 10; contacts $F_2$, $R_2$ which are connected in the control circuit for the dashpot relay 22 of the accelerating unit; and contacts $F_3$, $R_3$ which are connected in the control circuit for the pile solenoid 14.

The control circuit for effecting forward motion of the motor 10 which is controlled by make contacts $F_1$ on relay F extends from the positive terminal 19 of the source, make contacts of $F_1$, carbon pile resistor 13, the armature of motor 10, break contacts of $R_1$, and the series winding 20 of motor 10 to the ground terminal of the source.

The control circuit for effecting reverse motion of motor 10, which is controlled by the make contact of $R_1$, extends from positive terminal 19 of the source over make contacts $R_1$, the armature of motor 10, carbon pile resistor 13, break contacts of $F_1$, and series winding 20 of motor 10 to the ground terminal of the source.

The speed of the vehicle is essentially determined by the value of the resistance inserted in the motor control circuit by adjustable carbon pile 13, the actual value of such inserted resistance being in turn determined by the pressure applied to the carbon pile by an associated pile solenoid 14.

The pile solenoid 14 is controlled in its operation by adjusting the resistance in the energizing circuit for same to different values, such adjustment being effected by a dash-pot relay 22 and its associated resistor unit 27.

The dashpot relay 22 which controls the pressure exerted by the pile solenoid on carbon pile 13 is normally energized over a fuse, and when energized inserts the full value of the resistance 27 in the pile solenoid circuit. With operation of either of the control relays F or R, the energizing circuit for dashpot relay 22 is interrupted, and the dashpot relay releases slowly to effect a progressive decrease, at a predetermined selective rate, in the resistance 27 in the circuit for the pile solenoid 14.

A speed control circuit consisting of speed control relay 91 and adjustable potentiometer 96 are connected over the automatic circuit to operate when the sum voltage reaches a value predetermined by the setting on potentiometer 96. Control relay 91 is connected to control the insertion and removal of the common resistor elements of resistance unit 27 in the pile solenoid circuit to maintain the speed at the desired level.

A dynamic braking circuit including a sensing relay 49 protected by resistance members 47 and 48 and by current limiting diodes 50—53, connected across the armature to operate whenever a voltage appears thereacross.

Dynamic braking relay 57 is connected for operation by a circuit which is completed only when the control relays are restored (i.e., power off) and the propulsion means is turning to generate an E.M.F. across the armature of motor 10, the circuit extending from the positive terminal 19 of the source over fuse 28, conductor 29, contacts $F_2$, $R_2$ of the restored control relays, contacts 54, 55 of operated sensing relay 49 and the winding of dynamic braking relay 57 to ground on terminal 58.

Dynamic braking relay 57 at its contacts 57a completes the energizing circuit for the motor shunt field 45, and simultaneously completes an energizing circuit over resistance 24 to pile solenoid 14 to control same to further adjust the value of resistance 13 in the motor circuit and consequently the dynamic braking effect of the motor 10.

*Specific operation*

The specific manner of operation of the control system shown in FIGURE 1 will be best understood by describing the operation of the system responsive to operation of the forward or reverse buttons. The manner of operation of the system responsive to the receipt of guidance signals over terminals, such as 33, to energize the system will be apparent.

With the closure of the forward push button $F_{pb}$, an energizing path is completed for forward relay F which operates, and at its make contacts $F_1$, establishes an energizing path for motor 10; at its contacts $F_3$ completes an energizing circuit for pile solenoid 14; and at its contacts $F_2$ interrupts the holding circuit for dashpot or accelerating relay 22 to effect the gradual release thereof and a gradual reduction in resistance of the energizing circuit for pile solenoid 14. The pressure exerted by the pile solenoid on carbon pile 13 is correspondingly increased, and a gradual acceleration of the motor 10 is attained.

Specifically, relay F in its operation closes its make contacts $F_1$ to complete an energizing circuit for motor 10 which extends from the positive terminal 19 of the source, over make contacts $F_1$, carbon pile 13, armature of motor 10, break contacts $R_1$, and series winding 20 to ground. For purposes of illustration, it is assumed that the illustrated direction of current flow through motor 10 upon the energization of control relay F is translated by the motor into forward motion of the vehicle. Since the maximum resistance is inserted by carbon pile 13 in the armature of motor 10 at this time the initial current flow and motor speed is small.

Control relay F in its operation is effective at contacts $F_3$ to complete the energizing circuit for the pile solenoid including resistance 27, the circuit extending from the positive terminal 19 of the source over safety fuse 28, conductor 29, contact $F_3$, resistance 27, conductor 32 and the pile solenoid 14 to ground.

It is also recalled that accelerating relay 22 is normally energized prior to operation of the pushbutton $F_{pb}$ or $R_{pb}$, the circuit extending from the positive battery terminal 19, over safety fuse 28, conductor 29, closed contacts $F_2$, $R_2$ of the control relays F and R, the winding of accelerating relay 22 and resistor 25 to ground. Since accelerating relay 22 in its energized condition inserts a maximum resistance in the pile solenoid circuit, there is minimum current flow through pile solenoid 14, and minimum pressure is exerted on the carbon pile 13 to effect a maximum resistance to current flow in the armature circuit for motor 10. Accordingly, the motor turns over at minimum speed as the pile solenoid is first energized.

As the dashpot-relay 22 restores itself slowly, the resistance inserted in the pile solenoid circuit is gradually decreased, and the current flowing through the pile solenoid 14 gradually increases to in turn effect a gradual and smooth increase in the pressure applied by the pile solenoid 14 to carbon pile 13. As such applied force is gradually increased, a smooth and gradual decrease in the resistance of carbon pile 13 is effected, and a gradual increase of current flow through motor 10 is accomplished to provide a smooth and safe acceleration of the vehicle driven by motor 10.

Figure 2:
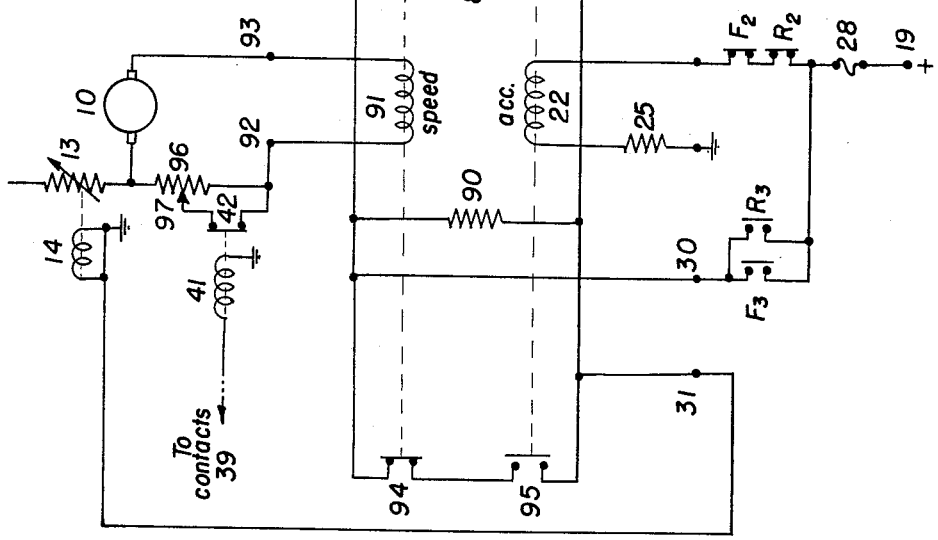
FIGURE 2 is a schematic diagram, illustrating in greater detail a portion of the circuitry shown generally in FIGURE 1.

The operation of resistance 27 in the novel control circuit has been generally described in connection with FIGURE 1. However, as is particularly illustrated in FIGURE 2, resistance 27 may actually comprise a plurality of resistors 80—89, which are adapted to be selectively connected in parallel with a fixed resistor 90 by accelerating relay 22 in cooperation with speed control relay 91. For convenience, the circuit of FIGURE 2 is hereinafter designated the "regohm circuit."

The regohm circuit shows the accelerating relay 22 in its normally energized position, as it is maintained over a previously described circuit prior to energization of either solenoid F or R (FIGURE 1). When solenoid 22 (FIGURE 2) is in the energized position (as shown in FIGURE 2), contacts 95 and each of contacts 70—79 are in the open position; accordingly the value of the resistance appearing at terminals 30 and 31 is a maximum, and is equal to the resistance value of resistor 90. This condition of the regohm circuit is indicated in FIGURE 1, wherein arm 26 of potentiometer 27 is shown in the maximum counter-clockwise position, thereby inserting maximum resistance (resistor 90) between terminals 30 and 31.

When accelerating solenoid 22 is de-energized responsive to the energization of either solenoid F or R and upon the consequent opening of either contacts $F_2$ or $R_2$, the force holding contacts 95 and each of contacts 70—79 in the open position is removed, and the contacts close in sequence, commencing with contacts 79, then contacts 78, etc., until contacts 70 close; after all of these contacts have closed, contacts 95 are closed. With the closure of each successive contact an additional resistance is inserted in parallel with resistance 90 and a decreasing amount of resistance is applied in the pile solenoid circuit to effect increased motor speed in the manner above described.

In more detail, after contacts 79 have closed, the resistance appearing at terminals 30 and 31 is that of the parallel combination of resistors 89 and 90; after contacts 78 close, the resistance presented is that of the parallel combination of resistors 88—90, and so forth, until contacts 70 close. At this time, the resistance appearing at terminals 30 and 31 has been reduced to the equivalent of the resistance afforded when resistors 80—90 are connected in parallel. Upon the subsequent closure of contacts 95, an effective short circuit is placed across terminals 30 and 31, and the circuit for the pile solenoid then extends from terminal 30, over contacts 94 and 95, terminal 31 and the winding of pile solenoid 14 to ground. Such a short circuit is the equivalent, in FIGURE 1, of rotating arm 26 of resistance 27 in a clockwise direction throughout its range of travel, until arm 26 contacts terminal 30 at which time maximum current passes through the pile solenoid to effect maximum motor speed. Thus the regohm circuit cooperates in the first step of translating a two-position control signal ("stop" and "go") into a gradual acceleration signal.

According to a feature of the invention the regohm circuit illustrated in FIGURE 2 is also used to regulate the speed of the truck propelled by motor 10 after controlled acceleration has taken place. Such action is provided by a speed sensing means, such as the illustrated sensing circuit 23 which utilizes a relay normally connected in series with potentiometer 96 across motor 10 (FIGURES 1 and 2), or an electromechanical tachometer (not shown) or other means for producing a signal proportional to speed may be used. From FIGURE 1 it is apparent that the voltage appearing across the armature of motor 10 also appears across the series circuit comprising the upper portion of potentiometer 96, the movable arm 97 of potentiometer 96, contacts 42, terminal 92, the winding of coil 91, and terminal 93. Thus it appears that for a given voltage appearing that the terminals of motor 10, the amount of that voltage which appears across coil 91 depends upon the setting of arm 97 of potentiometer 96. With arm 97 in its uppermost position and contacts 42 closed, potentiometer 96 is effectively shorted out and the same voltage appearing across the terminals of motor 10 likewise appears across coil 91. On the other hand, with contacts 42 closed and arm 97 in its lowermost position, the entire resistance of potentiometer 96 appears in series with coil 91, and the voltage appearing across motor 10 then has its minimum effect upon coil 91. Thus the setting of arm 97 regulates the current flow through coil 91 for a given voltage output from motor 10. Since the voltage across the armature of motor 10 is proportional to the speed of the truck, the current through coil 91 is similarly proportional to the speed of the truck and is additionally related to the setting of the movable arm 97 of potentiometer 96. Accordingly the speed at which the relay 91 operates may be preset by appropriate adjustment of the arm 97.

Referring now to FIGURE 2, it is seen that coil 91 is arranged to control contacts 60—69 in the connection of resistors 80—89 in parallel with resistor 90, and contacts 94 to short circuit the resistors 80—90. Contacts 60—69 are shown in the closed position, the position of the contacts when coil 91 has no current flowing therethrough. Contacts 94 will be pulled out when a certain minimum current flows through coil 91; next contacts 60 will be opened, then contacts 61, etc.

For exemplary purposes, it is now apparent that it is desired to control the truck propelled by motor 10 at a speed which can be determined by a certain setting of arm 97 of potentiometer 96; and that at such speed, the voltage generated across the motor (and across the selected portion of potentiometer 96 and coil 91 in series) is just sufficient to effect opening of contacts 94 and contacts 60—62 by speed coil 91. The operation of the system with such setting is now described.

After the arm 97 of potentiometer 96 has been adjusted for the desired speed regulation, pushbutton $F_{pb}$ may be operated to energize the "forward motion" coil F which operates to open contacts $F_2$, etc., breaking the energizing circuit for accelerating coil 22 (FIGURE 2). As the accelerating coil slowly restores, contacts 70—79 begin to close, starting with contacts 79, then contacts 78, etc. After contacts 79, 78 and 77 have closed and resistors 89—87 have been thus connected in parallel with resistor 90, the speed developed by the truck is still sufficiently low that the current flowing through coil 91 is insufficient to open a single contact. However, after resistor 86 is also connected in the parallel circuit, the truck attains a speed such that the current through the coil 91 is just sufficient to open contacts 94. As contacts 75 close to connect resistor 85 in the parallel circuit, the truck accelerates and the current through coil 91 increases, becoming sufficient to open contacts 60 above resistor 80. Similarly, as contacts 74 close to connect resistor 84 in the parallel circuit, the current increases further through coil 91 and contacts 61 above resistor 81 are opened. Resistor 83 is then connected into the parallel circuit by the closure of contacts 73, increasing the speed of the truck and likewise increasing the current flowing through coil 91 to a degree sufficient to open contacts 62 above resistor 82. It will be understood that the current may not in practice be so exactly balanced, but the effect is nevertheless identical to that described here. Next, contacts 72 below resistor 82 are closed, in their normal sequence, but this contact closure is ineffective to connect resistor 82 in the parallel circuit by reason of the previous opening of contacts 62 by the tractive force exerted by coil 91. Thus the truck has attained a predetermined speed, preset by the adjustment of movable arm 97 of potentiometer 96, which adjustment determines the current through coil 91 for a given voltage output of motor 10.

Contacts 72, 71, 70, and 95 continue to close, because coil 22 is de-energized and in predetermined time, all of contacts 70—79 and 95 close. However, to attain the predetermined speed, the current through coil 91 has effected the opening of contacts 94 and of the three contacts 60—62 above resistors 80—82. The regohm circuit, utilizing the cooperation of coil 91 and contacts 94 and 60—69 actuated thereby, is now effective to regulate the speed of the vehicle driven by motor 10.

That is, if the truck accelerates further to reach a speed beyond the preassigned speed, contacts 63, 64, etc., above resistors 83, 84, etc., will be opened in turn, thus increasing the effective resistance across terminals 31 and 30 by removing resistors from the parallel connection. This increased resistance appearing at terminals 30 and 31 is in series with the pile solenoid 14, and thus reduces the current flowing therethrough. This current in turn reduces the force exerted upon the carbon pile 13, thus increasing its resistance, which is connected in series with the armature circuit of motor 10 (FIGURE 1). This resistance increase reduces the armature current and thus reduces the speed of the motor 10.

Conversely, should the truck decelerate to a speed lower than its preassigned speed, the current through coil 91 decreases and contacts 62, 61, and 60, above resistors 82, 81 and 80, and contacts 94, close in sequence to reduce the effective resistance across terminals 30 and 31, increasing the current through pile solenoid 14 and thus increasing the force applied to carbon pile 13, decreasing the carbon pile resistance and increasing the armature current of motor 10 to thereby increase the truck speed. Accordingly, the action of coil 91 in cooperation with its contacts 94 and 60—69 is effective to produce an accurate and even regulation of the speed of the vehicle propelled by motor 10.

It is apparent that the speed of the truck may be preset by utilizing the movable arm 97 of potentiometer 96. Such pre-setting is especially useful if, for example, a remote control signal is coupled to terminal 33 (FIGURE 1) and effects the starting progress of the truck without any operator in the vicinity of the truck. However, if the truck is manually controlled an operator may wish to drive the truck at a speed higher than its preset speed without affecting the setting of movable arm 97. To this end the contacts 39 are provided to the right of push button contacts 38, both of which contacts are closed when the manual "forward" push button is depressed. Closure of contacts 39 completes an operating circuit for coil 41, the circuit extending from positive battery at terminal 19, over fuse 28, contacts 37, 39, and the winding of coil 41 to ground. Coil 41 operates and opens contacts 42, thus opening the circuit of movable arm 97 of potentiometer 96 (FIGURE 2). This action insures that the maximum resistance of potentiometer 96 is maintained in series with the resistance presented by coil 91, so that none of contacts 94 and 60—69 are opened as the truck driven by motor 10 accelerates. Thus, after coil 22 is de-energized and all of contacts 70—79 and 95 are closed, an effectual short circuit is presented across terminals 30 and 31 and the truck attains a maximum speed.

The operation of the control circuitry when control relay R is energized is obvious from the foregoing description, it being noted that in such event the current flows through motor 10 in a direction opposite to the current flow previously effected to effect operation of the vehicle in the forward direction, the energizing circuit for the motor in such operation having been described above.

Figure 3:
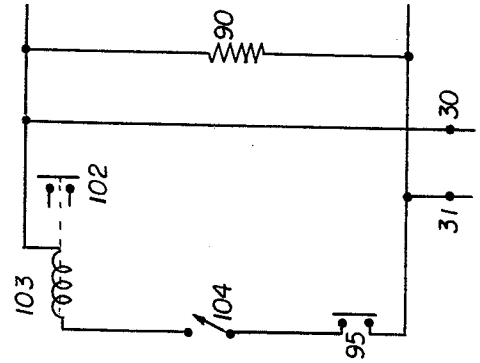
FIGURE 3 is a partial schematic diagram illustrating a modification of a portion of the circuitry shown in FIGURE 2.

In certain applications of the inventive control system it may be desired to control only the acceleration of the truck, and to permit the truck to attain a maximum speed upon the termination of the acceleration control operation. To accomplish these ends, the circuitry at the left hand portion of FIGURE 2, including contacts 94 and 95, may be modified as shown in FIGURE 3. As there shown, this modification includes the removal of contacts 94 and the replacement thereof by a switch member 104 serially connected to the winding of a relay 103. Responsive to its operation, relay 103 is arranged to close contacts 102 and thereby, as shown in FIGURE 1, short out the carbon pile 13.

When it is desired to permit the truck to attain maximum speed after acceleration, the switch 104 is closed before the truck is operated. Thus, after relay 22 (FIG. 2) is deenergized to control the acceleration of the vehicle, contacts 79—70 close in sequence, and contacts 95 close to complete an operating circuit for relay 103, the circuit extending from operating potential at terminal 19, over fuse 28, the operated ones of contacts $F_3$ or $R_3$, terminal 30, winding of relay 103 (FIG. 3), contacts of switch 104, contacts 95, terminal 31, and the winding of relay 14 (FIG. 2) to ground. Relay 103 operates and at its contacts 102 short circuits carbon pile 13 (FIG. 1). Thus the resistance of the carbon pile 13 connected in series with the armature circuit of drive motor 10, is reduced to zero permitting the truck to attain a maximum speed after control of truck acceleration has been completed.

In accordance with another aspect of the invention, the same control system utilizes a number of the previously described components to effect dynamic braking of the vehicle by the motor 10. Briefly, it is apparent that with opening of the forward or reverse switches F or R the energizing circuit for the motor is interrupted. In most industrial truck applications, however, the weight and velocity of the truck is such that auxiliary brake means are desirable. In the present arrangement a shunt field 45 for motor 10 is energized whenever the motor drive circuits are opened and the motor itself has not come to a full stop.

The dynamic braking system basically comprises a minimum speed sensing circuit including a sensitive relay 49 connected in parallel with motor 10, so that the potential appearing at the motor terminals is impressed thereacross. Resistors 47 and 48 are serially connected with relay 49, and diodes 50—53 are connected to protect the winding of relay 49 by shunting excess currents around the relay.

Thus whenever the armature of motor 10 is rotated a voltage appears across sensitive polarized relay 49 to operate same and displace armature 54 to contacts 55 or 56, depending on the direction of current flow through relay 49, which in turn depends on the direction in which the truck is being driven.

Sensitive relay 49 at its contacts 54—56 prepares an operating circuit for dynamic braking relay 57, the circuit extending from operating potential at terminal 19, over fuse 28, conductor 29, contacts $F_2$ and $R_2$, armature 54 and the operated ones of contacts 55 and 56, the winding of relay 57, to a point of reference potential (such as ground, not shown) at terminal 58.

It will be recalled that during operation of the truck, control relays F or R are operated and either contacts $F_2$ or $R_2$ are opened. Thus even if the sensitive relay 49 is operated, the circuit for the dynamic braking relay is interrupted by the control relay at its contacts $F_2$ or $R_2$. With restoration of the open one of the contacts $F_2$ or $R_2$, the operating circuit for the dynamic braking relay is completed to effect the braking action.

Briefly, dynamic braking relay 57 operates and at its contacts 57a couples operating potential to shunt field 45 and rectifier 46 over a circuit extending from terminal 19, conductor 101, contacts 57a, shunt field 45, to ground. Thus the shunt field of motor 10 is excited to apply dynamic braking to the system. Such braking is applied to the system as long as motor 10 is still rotating to generate a minimum voltage and maintain relay 49 in the energized condition. Dynamic braking relay 57 simultaneously completes an energizing circuit for pile solenoid 14 to effect further braking by the motor. That is, dynamic braking relay 57 at its contacts 57a also extends the operating potential at terminal 19, over conductor 101, contacts 57a, the effective portion of potentiometer 24, conductor 32, and pile solenoid 14 to ground. This rapid current increase causes a corresponding rapid decrease in the resistance presented by carbon pile 13, and the braking resistance presented by pile 13 in the shunt circuit extending from one terminal of motor 10, over carbon pile 13, break contacts $F_1$, break contacts $R_1$, to the other terminal of motor 10 results in an increased braking effect. This rapid though smooth decrease in the braking resistance provides a dynamic braking circuit which is highly effective, and yet utilizes the same regulator which controls the speed and acceleration of the truck as the variable braking resistor, thus effecting substantial economy in the inventive structure.

The operating potential coupled to the shunt field 45 is also coupled to terminal 100. This potential may be applied to the steering motor (not shown) of the truck, to insure that steering control is maintained until the truck has reached a dead stop. In the above-identified copending application of Robert De Liban, for example, such potential could be utilized to maintain this steering motor 50 (FIGURE 3 of the De Liban application) energized until the controlled truck comes to a complete stop. The importance of maintaining the steering equipment energized until the truck is at rest is manifest and requires no elaboration.

The invention is effective to provide a close and smooth regulation of the acceleration of a guided vehicle, and is similarly effective to secure speed regulation at a predetermined speed. Thus the margin of protection afforded by practice of the invention to persons and property in the vicinity of a guided unit installation is manifest. Of especial merit is the fact that the improved operating functions of acceleration and speed control are accomplished by a common control system, whereby a simple and economical type structure is provided which permits its ready incorporation into guided vehicles operating in existing guidance systems.

Although only particular embodiments of the various aspects of the invention have been shown and described, it is apparent that modifications and alterations may be made, and it is intended in the appended claims to cover all such modifications and alterations as may fall within the true spirit and scope of the invention.

What is claimed is:

1. In a control system for controlling energization of the propulsion means for an industrial truck from a predetermined source, a variable electrical controller adjustable throughout its range to couple variable energy levels to said propulsion means to adjust the speed thereof, actuator means operative to automatically adjust said controller to effect acceleration of said propulsion means at a predetermined rate to a predetermined speed, dynamic braking means for said propulsion means, means for energizing said dynamic braking means, means for connecting said variable electrical controller in parallel with said propulsion means during energization of said dynamic braking means, and means for connecting a control signal to said actuator means to control same to adjust said controller to effect a predetermined further dynamic braking action for said propulsion means.

2. An industrial truck including, in combination, a prime mover comprising an electric motor, an electric power supply circuit for said motor including first variable resistance means, and a control circuit for said power supply circuit including electrically actuated means for decreasing the effective resistance of said first variable resistance means, second variable resistance means for varying the supply of power to said electrically actuated means, first adjustable means operable at a selective speed upon initial energization of said power supply circuit for gradually decreasing the effective resistance of said second variable resistance means for effecting gradual acceleration of said motor and the truck at a preselected rate, means responsive to the speed of the motor for limiting the decrease in effective resistance of said second variable resistance means, and second adjustable means associated with said speed responsive means for varying the motor speed at which said speed responsive means will limit the decrease in effective resistance of said second variable resistance means.

3. In a control system for controlling energization of the propulsion means for an industrial truck, a variable carbon pile resistance element adjustable throughout its range to supply energy at different levels to said propulsion means to vary the speed of said truck, solenoid means operative to different positions to adjust said carbon pile resistance element throughout its range, an adjustable electro-mechanical resistance control unit for supplying energy at different levels to said solenoid means, a first regulating means for progressively adjusting the effective resistance value of said control unit at a predetermined rate to effect at said rate a progressive transition in the level of energy supplied to said solenoid means, and thereby control acceleration of said propulsion means and of said truck, and a second regulating means for adjusting the effective resistance value of said control unit to govern the level of energy supplied to said solenoid means in accordance with the speed of said propulsion means, thereby to govern the speed of the propulsion means and the truck.

4. A control system for propulsion means comprising first variable impedance means coupled to the propulsion means for supplying variable energy levels to said propulsion means to govern the speed thereof, first actuator means for varying the effective impedance of said first variable impedance means, second variable impedance means coupled to said first actuator means for supplying variable energy levels thereto to govern the variations in effective impedance of said first impedance means, second actuator means for effecting at a predetermined rate a progressive transition in the effective impedance of said second variable impedance means, and third actuator means responsive to the speed of said propulsion means for governing the effective impedance of said second variable impedance means as a function of the speed of said propulsion means.

5. A control system for propulsion means comprising first variable impedance means coupled to the propulsion means for supplying variable energy levels to said propulsion means to govern the speed thereof, first actuator means for varying the effective impedance of said first variable impedance means, second variable impedance means coupled to said first actuator means for supplying variable energy levels thereto to govern the variations in effective impedance of said first impedance means, second actuator means operative upon energization of said propulsion means for effecting at a predetermined rate a progressive transition in the effective impedance of said second variable impedance means thereby to control acceleration of said propulsion means, and third actuator means responsive to the speed of said propulsion means for governing the effective impedance of said second variable impedance means as a function of the speed of said propulsion means, said third actuator means including means for varying its responsiveness to the speed of said propulsion means for governing said second impedance means to maintain a predetermined speed of operation of said propulsion means.

6. A control system as set forth in claim 5, including means for by-passing said last-named means to condition said propulsion means for operation at full speed.

7. A control system for controlling energization of the propulsion means for an industrial truck comprising: controller means adjustable throughout its range to supply variable energy levels to said propulsion means to control the speed thereof, an electrically-operated actuator for said control means, and a control circuit for said actuator comprising variable resistance means in circuit with said actuator, a first means cooperable with said variable resistance means for sequentially decreasing the effective resistance of said variable resistance means in a selected time to effect an increase of current flow in said circuit at a controlled rate, and a second means responsive to the speed of the propulsion means and cooperable with said variable resistance means for selectively increasing and decreasing the effective resistance of said variable resistance means to maintain a predetermined current flow therethrough, thereby to provide a predetermined constant truck speed.

8. A control system as set forth in claim 7 in which said first means includes a slow-to-release solenoid, and means for maintaining said solenoid normally energized during periods of non-operation of said propulsion means.

9. A control system for controlling energization of the propulsion means for an industrial truck comprising: controller means adjustable throughout its range to supply variable energy levels to said propulsion means to control the speed thereof, electrically-operated adjusting means for adjusting said controller means, and a control circuit for said electrically-operated adjusting means comprising a plurality of resistance elements adapted to be connected in parallel with one another, means for effecting progressive connection of at least a number of said resistance elements in said circuit in a selected time to effect an increased current flow therein in a given predetermined time period, and sensing means connected to respond to the speed of said propulsion means for effecting selective connection and disconnection of said resistance elements in said circuit, to thereby govern the speed of said propulsion means and thus regulate the truck speed.

10. A control system as set forth in claim 9 in which said sensing means includes means for variably adjusting the degree of responsiveness of the sensing means to the speed of said propulsion means and thus adjusting the level at which the truck speed is regulated.

11. A control system for the propulsion means of an industrial truck comprising an adjustable impedance means coupled to the propulsion means for said truck for supplying energy at different levels to said propulsion means to govern the speed of the truck, a signal-responsive actuator for varying the effective impedance of said adjustable impedance means responsive to variations in the level of a control signal supplied to said actuator, an energizing circuit for said signal-responsive actuator including variable resistance means connected in said energizing circuit, and preadjusted timer means operative responsive to energization of said propulsion means to vary the effective resistance of said variable resistance means in successive increments at a predetermined time rate to provide a constant predetermined rate of acceleration for the propulsion means of the truck.

12. A control system for maintaining the speed of the propulsion means of an industrial truck at a predetermined value comprising an adjustable carbon pile impedance means coupled to the propulsion means for said truck to supply energy at different levels to said propulsion means, a carbon pile solenoid for varying the effective impedance of said carbon pile responsive to variations in the level of a control signal supplied to said carbon pile solenoid, an energizing circuit for said carbon pile solenoid including variable resistance means operative to a plurality of different positions to provide correspondingly different values of resistance in said energizing circuit and corresponding variations of said control signal level, circuit means connected to said propulsion means to continually provide a regulating signal of a level related to the speed value of said propulsion means, a linking actuator member coupled to said variable resistance means operable to different positions to correspondingly vary the position of said variable resistance means, and coil means connected to said circuit means operative responsive to variation in said regulating signal level to move said linking actuator member, and thereby said variable resistance means, to the position which maintains the speed of said propulsion means at said predetermined value.

References Cited in the file of this patent

UNITED STATES PATENTS

| | | |
|---|---|---|
| 1,201,016 | Bradley | Oct. 10, 1916 |
| 2,454,671 | Roberts | Nov. 23, 1948 |